Figure 1:
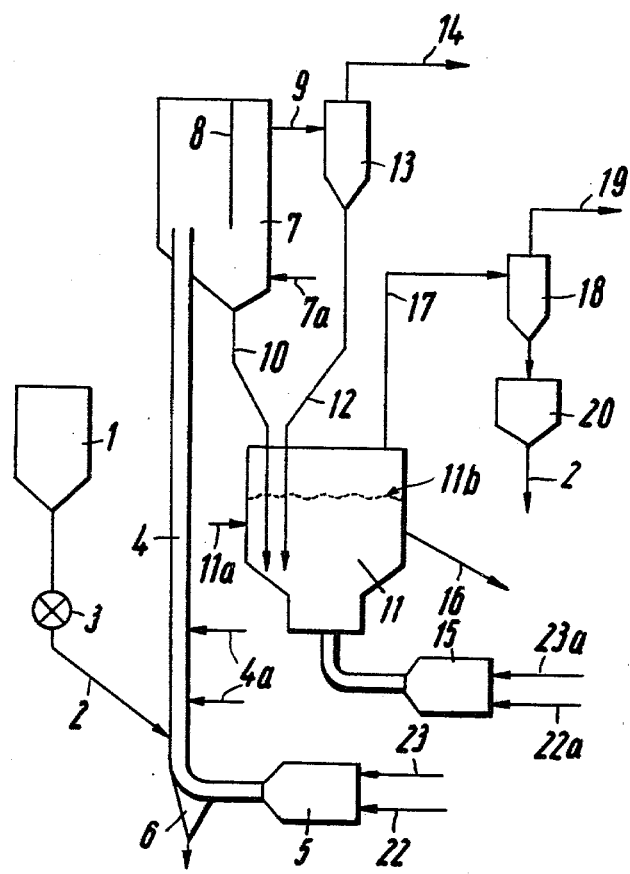

United States Patent [19]

Rammler

[11] 4,345,914

[45] Aug. 24, 1982

[54] METHOD OF HEATING FINE-GRAINED SOLIDS

[75] Inventor: Roland Rammler, Königstein, Fed. Rep. of Germany

[73] Assignee: Metallgesellschaft Aktiengesellschaft, Frankfurt am Main, Fed. Rep. of Germany

[21] Appl. No.: 187,856

[22] Filed: Sep. 16, 1980

Related U.S. Application Data

[63] Continuation of Ser. No. 33,644, Apr. 25, 1979, abandoned, which is a continuation of Ser. No. 823,777, Aug. 11, 1977, abandoned.

[30] Foreign Application Priority Data

Aug. 20, 1976 [DE] Fed. Rep. of Germany ....... 2637427

[51] Int. Cl.$^3$ .............................................. C10L 5/08
[52] U.S. Cl. ..................................... 44/10 C; 44/10 K; 44/10 H; 34/10; 432/15
[58] Field of Search ................................... 432/14–16, 432/58, 106; 34/10, 57 A, 57 R; 44/10 H, 10 C, 10 E, 10 J, 10 K

[56] References Cited

U.S. PATENT DOCUMENTS

| | | | |
|---|---|---|---|
| 3,203,681 | 8/1965 | Rosa et al. | 34/57 R |
| 3,663,186 | 5/1972 | Dzhaparidze et al. | 44/10 K |
| 3,804,581 | 4/1974 | Schmalfeld et al. | 432/58 |
| 3,926,576 | 12/1975 | Schmalfeld et al. | 44/10 H |
| 3,980,447 | 9/1976 | Franke et al. | 44/10 J |
| 4,002,534 | 1/1977 | Rammler et al. | 44/10 C |
| 4,097,245 | 6/1978 | Holowaty | 44/10 K |
| 4,102,750 | 6/1978 | Nishihara et al. | 44/10 K |

*Primary Examiner*—Carl F. Dees
*Attorney, Agent, or Firm*—Sprung, Horn, Kramer & Woods

[57] ABSTRACT

A process for heating fine-grained solids, especially carbonaceous solids such as coke or oil shale, by a process wherein solids are heated to 500° to 920° C. in direct contact with hot gases in a plurality of heating stages, the last of which is a fluidized bed heating process.

10 Claims, 2 Drawing Figures

METHOD OF HEATING FINE-GRAINED SOLIDS

This is a continuation of application Ser. No. 033,644, filed Apr. 25, 1979, now abandoned, which in turn is a continuation of application Ser. No. 823,777, filed Aug. 11, 1977, now abandoned.

This invention relates to a method of heating fine-grained solids, particularly carbonaceous solids, such as coke or oil shale.

It is an object of the invention to heat the fine-grained solids with the smallest possible expenditure of heat to an exactly adjustable, defined end temperature at a high throughput rate. This is accomplished according to the invention in that the solids are heated to 500° to 900° C. in direct contact with hot gases in a plurality of heating stages, the last of which is a fluidized-bed furnace. The use of a plurality of stages is more desirable than the use of a single stage with respect to heat economy because the exhaust gas from the initial stages is at lower temperatures than the exhaust gas obtained where only a single stage is used so that the heat losses are reduced. Another advantage of the multistage method according to the invention resides in that the fine-grained solids are subjected to lower thermal stresses than in a single heating stage so that the disintegration of particles is reduced. A desirable particle size range and a high strength are important properties of the heated solids and when fine coke is heated in the production of shaped coke these properties improve the quality of the end product.

Two heating stages will usually be sufficient in the method according to the invention. It is suitable, e.g., to cause the solids to be entrained by hot combustion gases which flow upwardly in a vertical pneumatic conveyor line, in which the solids are thus heated to a temperature between 400° and 800° C. and then to cause the solids to flow through a collecting vessel to a final heating stage consisting of a fluidized-bed furnace. This embodiment affords the advantage that only a small structural expenditure is required for the heating. It is specifically important for the purpose of the invention that the solids being heated in the vertical pneumatic conveyor line are conveyed upwardly therein at the same time so that there is no need for an intermediate mechanical conveyor to feed the solids to the succeeding fluidized-bed furnace. A large temperature rise of the solids can be affected in the pneumatic conveyor line.

It has been found that the two-stage heating method carried out in a pneumatic conveyor line and a succeeding fluidized-bed furnace greatly reduces the costs of producing briquettes and pellets from mixtures which contain the heated fine coke. In such production, the briquettes or pellets are shaped in known methods at a lower temperature from a mixture of hot coke and caking coal and/or tar pitch.

Combustion gases from one or more combustion chambers are usually employed to heat the solids in a pneumatic conveyor line and in a fluidized bed. Alternatively, the combustion gases may be produced entirely or in part in that oxygen-containing gas is fed to the conveyor line and/or the fluidized-bed furnace in order to effect a partial combustion of the solids to be heated. In some cases it may be desirable to feed cold or preheated secondary air to the conveyor line and/or the fluidized bed.

Any gases which are released as the solids are heated and which contain combustible constituents are desirably used as fuel in the pneumatic conveyor line and/or the fluidized-bed furnace. When fine-grained coal is heated, such combustible gases often become available at such a rate that their utilization is worth while.

Figure 2:
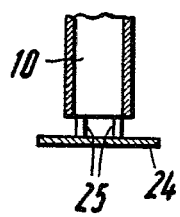

Additional features of the method will be explained with reference to the drawing, in which FIG. 1 is a diagrammatic view illustrating by way of example an embodiment of the method and FIG. 2 is an enlarged view showing the outlet end of a conduit for feeding solids to the fluidized-bed furnace.

The solids to be heated, e.g., coal, coke, or oil shale, flows from a supply bin 1 through a conduit 2, which incorporates a metering device 3, to the lower end of a vertical pneumatic conveyor line 4. Whereas the solids in the bin 1 may be at an elevated temperature as a result of a previous treatment, this is not essential for the present method. The fine-grained solids to be heated are upwardly entrained in the conveyor line by hot combustion gases, which are supplied to the conveyor line from a combustion chamber 5 and may contain oxygen when this is required. Excessively coarse-grained solids, which are not entrained by the gases are collected in a trap 6.

During their conveyance in the conveyor line 4 by the hot gases, the fine-grained solids are heated and they enter the collecting vessel 7 at a temperature between 400° and 800° C. The hot gases from the conveyor line 4 are deflected by a wall 8 and then discharged from the collecting vessel 7 through a conduit 9.

From the collecting vessel 7, the preheated solids flow through a conduit 10 into a fluidized-bed furnace 11, which constitutes the final stage of the heating method. Solids which have been collected by a cyclone 13 from the gas flowing in conduit 9 are also fed through conduit 12 to the fluidized-bed furnace 11. The gas from which dust has been collected leaves the cyclone 13 through a conduit 14 and is fed to unit, not shown, for further processing. Depending on the location of the plant and the temperature to which the solids are to be heated, this unit may consist, e.g., of a waste heat-utilization and final dust-collecting plant, an afterburner, or a cooling and condensing unit.

The fluidizing gases used as heating gases in the fluidized-bed furnace 11 are combustion gases supplied from a combustion chamber 15 and may have a residual content of free oxygen when this is required. In the fluidized-bed furnace, the gases are distributed in known manner by means of a grate or without a grate. When the solids which have been heated in the fluidized bed to an end temperature of 500° to 900° C., preferably at least 600° C., they are withdrawn from the fluidized-bed furnace through a conduit 16. The fluidizing gases leave the fluidized-bed furnace in a conduit 17 and are subjected to dust collection in a cyclone 18. The gas from which dust has been collected is then conducted in conduit 19 and is either combined with the exhaust gas in conduit 14 or is subsequently processed separately therefrom.

It is apparent from the drawing that the heated dust which has been removed in the cyclone 18 may be fed to a container 20 and be fed in conduit 21 to a point where it is used, e.g., together with the material from conduit 16. Alternatively, the dust from the cyclone may be returned to the fluidized-bed furnace, although this has not been shown on the drawing.

The two combustion chambers 5 and 15 are fed with preferably gaseous fuel through conduits 22 and 22a and with combustion air through conduits 23 and 23a. When the combustion gases are required to be at approximately the same pressure at the inlets of the conveyor line 4 and the fluidized-bed furnace 11, the embodiment shown in FIG. 1 may be modified in that fuel and air are supplied in common conduits. In this case, a common combustion chamber may be used to supply combustion gases to the fluidized-bed furnace 11 and to the pneumatic conveyor line 4. Different oxygen requirements in the conveyor line and the fluidized-bed furnace may be allowed for by a controlled addition of air, not shown, to the gas supply conduits leading to the conveyor line and the fluidized-bed furnace.

When the feed material has a high content of volatile constituents, particularly the gas which becomes available in conduit 14 may still have an appreciable heating value. This gas may then be cooled, purified and compressed and be subsequently used as fuel or additional fuel in the combustion chambers.

When carbonaceous material is heated with oxygen-containing gases and is partly burnt as it is heated, it may be useful to feed the gases at additional points. For this purpose, oxygen-containing gas can be supplied through conduits 4a (leading to conveyor line 4), 7a (leading to collecting vessel 7) and 11a (leading to fluidized-bed furnace 11). Air, which may be preheated, will usually be employed for this purpose. The conduit 11 for this secondary air leads to the upper half of the height of the fluidized bed formed by the solids in the fluidized-bed furnace, i.e., to a level below the upper surface 11b of the fluidized bed. Such supply of secondary air to a fluidized bed has already been described in U.S. Pat. No. 3,804,581.

A further modification of the heating method resides in that the fluidized-bed furnace 11 is constituted by the lower part of the collecting vessel 7 so that the fluidized bed is disposed in the vessel 7 adjacent to the outlet of conduits 7a and 10. The fluidized-bed furnace may be designed in known manner with or without a grate for distributing the gases. The means designated with reference numerals 10 and 17 to 21 will not be required if the fluidized bed is formed in the collecting vessel.

FIG. 2 is a longitudinal sectional view showing a preferred design of the outlet end of conduit 10. This outlet end is disposed in the fluidized-bed furnace 11 usually below the upper surface 11b of the fluidized bed. A baffle disc 24 is disposed a small distance apart from the outlet end of the conduit 10 and is connected to the latter by a plurality of webs 25 and ensures that solids coming from above can flow off only in a horizontal direction between the outlet end of the conduit 10 and the top of the disc 24 so that the flow is retarded. The outlet end of conduit 12 may be designed exactly like that of conduit 10.

Owing to the design of the outlet end shown in FIG. 2, a column of solids builds up in the conduit over the disc. Without the disc, the conduit would contain a layer of solids which are agitated as in the remaining cross-section of the fluidized bed. The gases which would rise in the conduit through a column of agitated solids would adversely affect the separating efficiency of the collecting vessel 7 and the cyclone 13. On the other hand, a column of bulk material provides a good barrier. The diameter of the disc and its spacing from the end of the conduit depend on the diameter of the conduit and the angle of repose of the outflowing solids. To provide for a versatile apparatus, it is a feature of the invention that either the disc or the pipe end can be adjusted in height by a suitable mechanism. This may afford substantial advantages particularly in plants for treating different starting materials.

When the solids are to be heated only to moderate temperatures below about 700° C., an operation in a single stage may be desirable in order to reduce the capital investment. In such case, either of the stages which have been described may be omitted. Whether the pneumatic conveyor line 4 or the fluidized-bed furnace 11 is omitted will depend on local and technological conditions. A heating in a single stage may also be sufficient when the solids to be heated are available at a relatively high temperature as a result of their previous treatment.

What is claimed is:

1. A process for heating a fine-grained coal or coke in direct contact with hot combustion gases which comprises feeding said coal or coke and oxygen containing hot gas to a vertical conveyor zone, heating and simultaneously partially combusting said coal or coke and effecting a considerable temperature rise of the coal or coke by the hot combustion gases and pneumatically transporting said coal or coke in said conveyor zone to a collecting zone, the coal or coke being thus heated to a temperature of 400°–800° C., causing said coal or coke to flow from said collecting zone to a final heating stage comprising a fluidized bed zone where the coal or coke is partially combusted in contact with oxygen-containing hot fluidization gases and being thus heated to a temperature of 500°–900° C., the coal or coke being thus heated in only two heating stages, and using the so-heated coal or coke in a mixture to produce briquettes or pellets.

2. A process according to claim 1 wherein the solids which are heated contain combustible components which are released from said solids as they are heated, the released gases containing combustible components being employed as a fuel for at least one of the heating stages.

3. A process according to claim 1 wherein the gases for the heating stages are fed to said stages from a common combustion chamber wherein said gases are heated.

4. A process according to claim 1 wherein a secondary gas which is air is preheated and is fed to said vertical conveyor line.

5. A process according to claim 1 wherein the fluidized bed process is effected in a fluidized bed furnace into which secondary air is added in the upper half of the height of the fluidized bed but below the upper surface of the components thereof.

6. A process according to claim 1 wherein the lower portion of said collecting vessel comprises a fluidized bed furnace wherein the solids are heated to the final temperature.

7. A process according to claim 1 wherein the fine-grained solids are entrained by the fluidizing gas, and the same are subsequently used with the solids withdrawn therewith from the fluidized bed process.

8. A process according to claim 1 wherein fine-grained solids are entrained by the fluidizing gas and thereafter said gas is separated from the solids which it has entrained and said gas is employed after separation of the withdrawn solids.

9. A process according to claim 1 wherein said fluidized bed process is performed in a fluidized bed furnace comprising a plurality of conduits through which the solids are passed with the fluidizing gas, at least one of the conduits thereof containing a baffle to at least partially retard the flow of the solids in the fluidizing gas.

10. A process according to claim 9 wherein the flow of solids is retarded by a baffle in the shape of a disc, said baffle being spaced a distance from the end point of a feed conduit through which the solids heated in a previous heating stage pass en route to said fluidized bed furnace.

* * * * *